United States Patent
Shin et al.

(10) Patent No.: US 8,708,856 B2
(45) Date of Patent: Apr. 29, 2014

(54) CONTINUOUSLY VARIABLE TRANSMISSION APPARATUS

(76) Inventors: Hyun Woo Shin, Anyang-si (KR); Yong Chol Sin, Anyang-si (KR)

(*) Notice: Subject to any disclaimer, the term of this patent is extended or adjusted under 35 U.S.C. 154(b) by 265 days.

(21) Appl. No.: 13/141,323

(22) PCT Filed: Mar. 18, 2009

(86) PCT No.: PCT/KR2009/001378
§ 371 (c)(1),
(2), (4) Date: Jun. 21, 2011

(87) PCT Pub. No.: WO2010/074367
PCT Pub. Date: Jul. 1, 2010

(65) Prior Publication Data
US 2011/0253496 A1    Oct. 20, 2011

(30) Foreign Application Priority Data

Dec. 26, 2008  (KR) .................. 10-2008-0134377
Feb. 5, 2009  (KR) .................. 10-2009-0009377

(51) Int. Cl.
*F16H 29/04* (2006.01)
(52) U.S. Cl.
USPC .............................. 475/170; 475/16; 74/117
(58) Field of Classification Search
USPC ............ 475/16, 269, 331, 296, 297, 170; 74/112, 116, 117, 118, 119, 122, 123, 74/124
See application file for complete search history.

(56) References Cited

U.S. PATENT DOCUMENTS

| | | | | |
|---|---|---|---|---|
| 3,013,446 A | * | 12/1961 | Charpentier | .................... 74/64 |
| 3,105,388 A | | 10/1963 | Bertin et al. | |
| 3,931,958 A | | 1/1976 | Hobbs | |
| 4,277,986 A | * | 7/1981 | Waddington | .................. 475/16 |
| 4,399,716 A | | 8/1983 | Karlsson | |
| 5,674,144 A | * | 10/1997 | Wiley | .......................... 475/170 |
| 2009/0197731 A1 | * | 8/2009 | Kobler | .......................... 475/166 |

FOREIGN PATENT DOCUMENTS

| | | | |
|---|---|---|---|
| GB | 2259741 A | * | 3/1993 |
| JP | 49-26204 | | 7/1974 |
| JP | 2004-263857 | | 9/2004 |

(Continued)

OTHER PUBLICATIONS

International Search Report for PCT/KR2009/001378 mailed Jan. 20, 2010.

*Primary Examiner* — Roger Pang
(74) *Attorney, Agent, or Firm* — AKC Patents LLC; Aliki K. Collins

(57) ABSTRACT

The present invention relates to a continuously variable transmission apparatus, which is characterized by comprising: an input shaft transferred with torque inputted from the outside; a plurality of driven gears which are arranged around the circumference of the input shaft as a certain phase difference and transferred with the power from the input shaft; a variable cam of which the turning radius can be varied by an external load; a variable input link which is coupled to and transferred with the torque of the input haft and allows the rotation thereof; a one-way clutch which is transferred undirectionally with the bidirectional torque to be transferred to the driven gears, respectively, and rotates the driven gears in one direction; a plurality of cam shafts which contact the one-way direction clutch internally or externally; and a plurality of output links, each of which one end revolves together with the variable cam around the center of rotation of the variable input link and the other ends of which are coupled to the cam shafts respectively and allow swiveling thereof.

6 Claims, 4 Drawing Sheets

(56) References Cited

FOREIGN PATENT DOCUMENTS

| JP | 2007-057040 | 3/2007 |
| KR | 10-2002-0087033 | 11/2002 |
| KR | 10-0858910 | 9/2008 |
| SU | 353089 | 9/1972 |
| SU | 551471 | 3/1977 |
| SU | 889975 | 12/1981 |
| SU | 1740827 | 6/1992 |

* cited by examiner

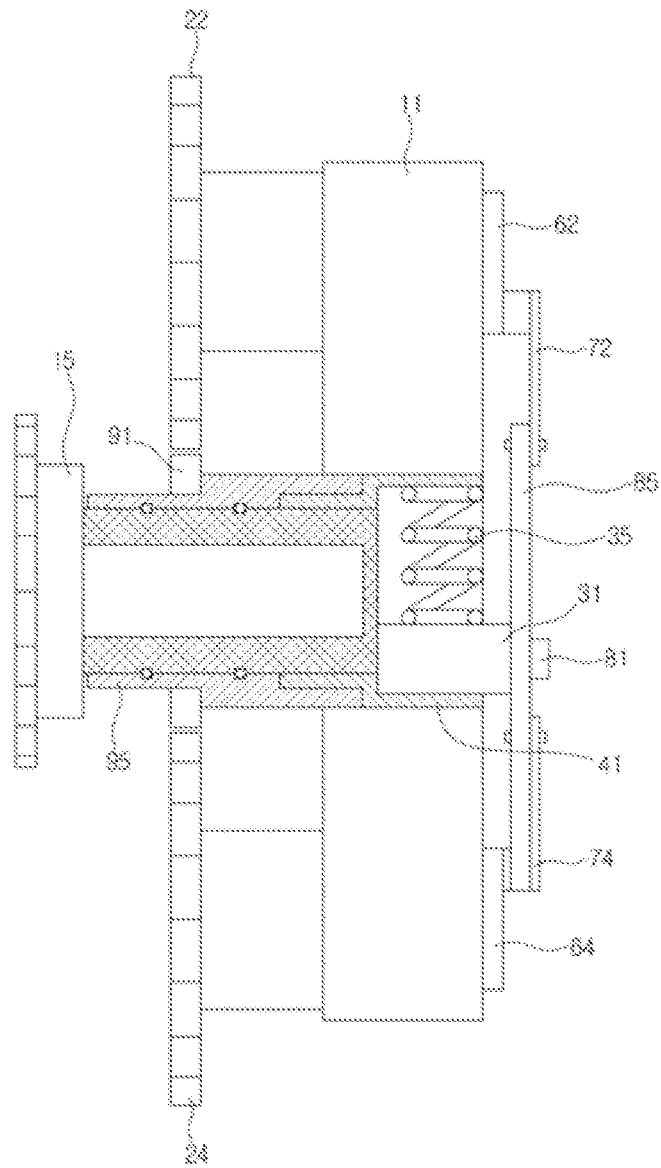

US 8,708,856 B2

CONTINUOUSLY VARIABLE TRANSMISSION APPARATUS

RELATED APPLICATIONS

This application is a 371 application of International Application No. PCT/KR2009/001378, filed Mar. 18, 2009, which in turn claims priority from Korean Patent Application Nos. 10-2009-0009377, filed Feb. 5, 2009, and 10-2008-0134377, filed Dec. 26, 2008, each of which is incorporated herein by reference in its entirety.

TECHNICAL FIELD

The present invention relates to a continuously variable transmission apparatus and in particular to a compact-sized continuously variable transmission apparatus in which an instant output torque can automatically increase and decrease depending on the increase and decrease of a load applied to an output shaft.

BACKGROUND ART

Decelerator typically is classified into a constant speed decelerator outputting a driving force at a constant deceleration speed in combination with the gears each having different sizes, and a continuously variable transmission changing a deceleration ratio by adapting a conical decelerator.

The rotational force from a driving generation apparatus such as a motor or an engine is outputted at a high rotation speed, but with less torque. In most of industrial machines, a decelerator is typically used, thus augmenting torque.

Here, the decelerator is directed to decelerating the revolutions from a driving force generation apparatus while increasing torque.

The decelerator decreases the revolution from a driving force generation apparatus, but increases and outputs the torque. In this case, when the load applied to the output shaft is higher than the output torque of the output shaft, such load might be reversely applied to a motor or an engine, thus decreasing the life span of a motor or an engine.

The load higher than the output torque of the output shaft is applied to a motor or an engine in a reverse direction, which inhibits a desired output from being transferred to the output shaft.

The non-stage transmission is disclosed in Korean patent application with the application number of 2007-0064349 which is originally intended to overcome the above problems.

The conventional non-stage transmission comprises a lever crank mechanism between an input shaft rotating in one direction by means of an external force (motor or engine), and an output shaft receiving a driving force of the input shaft and transferring the driving force.

The lever crank mechanism is a known mechanism allowing an output shaft converting one direction rotational movement of the input shaft to reciprocate within a certain angular range. There is a wiper driven apparatus which uses the above known mechanism.

However, the conventional non-stage transmission using the lever crank mechanism is directed to adapting a way that a driving force transfer system is deviated in one side, the operation of which leads to less vibrations and noises.

DISCLOSURE OF INVENTION

Accordingly, it is an object of the present invention to provide a continuously variable transmission apparatus which is made in a compact size and in which an instant torque can automatically increase and decrease depending on the increase and decrease of the load applied to an output shaft.

To achieve the above objects, there is provided a continuously variable transmission apparatus, comprising an input shaft receiving an externally inputted rotational force; a plurality of driven gears which are arranged around the input shaft each with certain phase difference, thus receiving a driving force from the input shaft; a variable cam the rotation radius of which changes by means of an external load; a variable input link receiving a rotational force of the input shaft and engaged to the input shaft in a rotation possible manner; a one direction clutch which receives bidirectional rotational force from the driven gears only in one direction, thus rotating each driven gear in one direction; a plurality of cam shafts which come into inner or outer contact with the one direction clutch; and a plurality of output links one end of each of which rotates idle with respect to the rotational center of the variable input link along with the variable cam, and the other end of each of which is rotatably engaged to each cam shaft, with the plurality of the output links having same lengths.

Here, preferably, there is further provided a reaction apparatus for pressing the variable cam with respect to the input shaft in a radial outward direction.

It is preferred that there is provided a disk plate rotating idle with respect to the rotational center of the variable input link along with the variable cam as one end of each of the plurality of the output links is engaged having a phase difference corresponding to the plurality of the driven gears, respectively.

The variable input link comes into inner or outer contact with the input shaft.

The input shaft comes into rotatable and inner contact with one output gear rotating in intermesh with the plurality of the driven gears, respectively.

The output gear has an integral circular output shaft having a rotation axis line of the same center with the rotation center of the input shaft.

The reaction apparatus is one of a spring, a hydraulic cylinder and a pneumatic cylinder.

EFFECTS OF THE INVENTION

In the above resolutions to the problems, a plurality of links each link-operating with a certain phase difference are symmetrically arranged at left and right sides at one variable input link, thus decreasing the parts and weights, which lead to a small sized construction. Since a torsion load doubled at an input shaft is not made, the input shaft helps enhance durability, thus obtaining a reliable driving force transfer, and at an accurate timing the links can switch revolving movements from the clockwise direction to the counterclockwise direction or vice versa.

BRIEF DESCRIPTION OF THE DRAWINGS

The present invention will become better understood with reference to the accompanying drawings which are given only by way of illustration and thus are not limitative of the present invention, wherein;

FIG. 5 is a vertical cross sectional view of a continuously variable transmission apparatus according to a second embodiment of the present invention.

Figure 1:
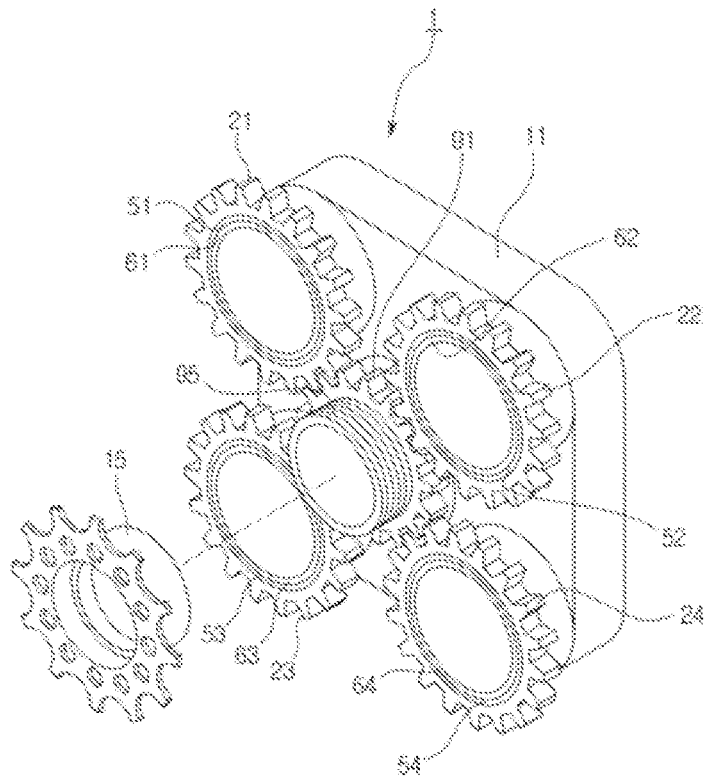
FIG. 1 is a perspective view of a continuously variable transmission apparatus according to a first embodiment of the present invention.

Descriptions of major reference numerals of the drawings

| 1, 1': continuously variable transmission apparatus | 15: input shaft |
|---|---|
| 21, 22, 23, 24: driven gears | 31: variable cam |
| 35: reaction force apparatus | 41: variable input link |
| 51, 52, 53, 54: one direction cutch | 61, 62, 63, 64: cam shafts |
| 71, 72, 73, 74: output links | 81: pin |
| 85: disk plates | 91: output gear |
| 95: output shaft | |

MODES FOR CARRYING OUT THE INVENTION

The present invention will be described in details with reference to the accompanying drawings.

In the following embodiments of the preset invention, the same elements are given the same reference numerals and are described as a representative in the first embodiment, and in the remaining embodiments, only the different constructions will be described.

Figure 2:
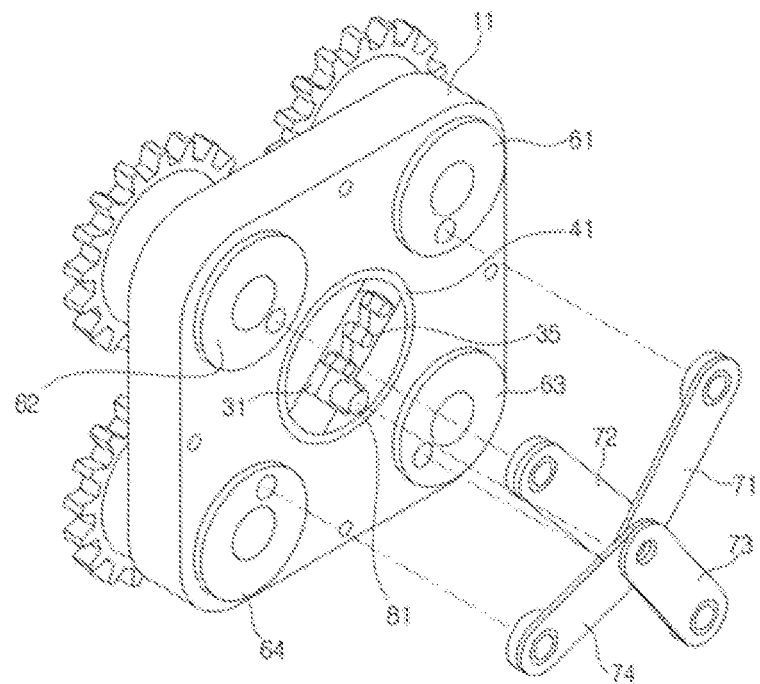
FIG. 2 is a rear perspective view of FIG. 1.
Figure 3:
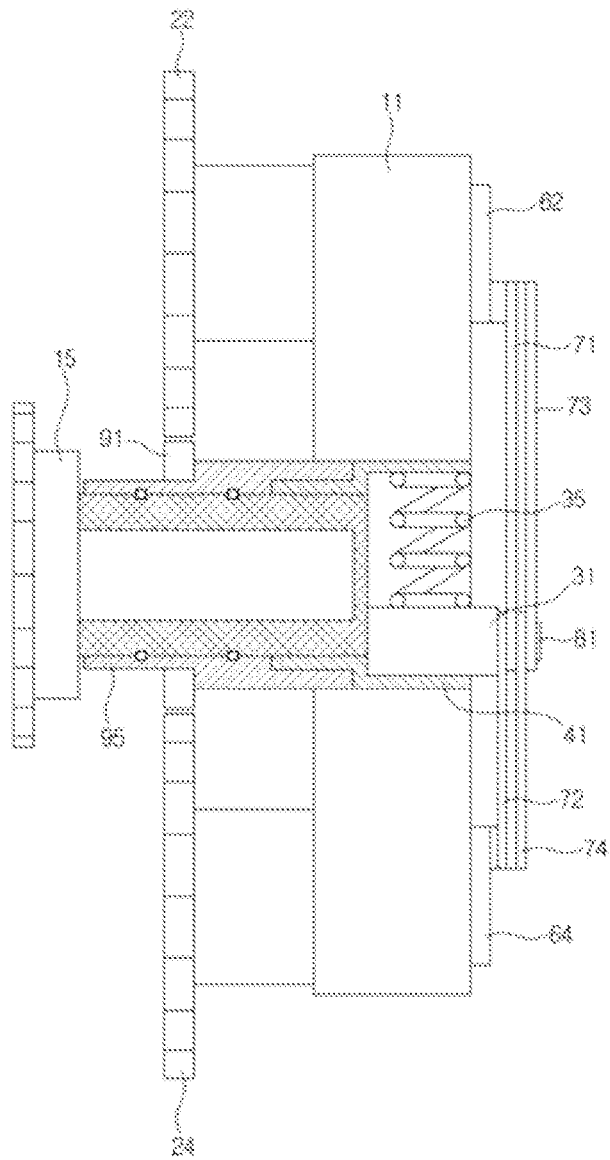
FIG. 3 is a vertical cross sectional view of FIG. 1.

FIGS. 1 to 3 show the continuously variable transmission apparatus according to the first embodiment of the present invention. As shown therein, the continuously variable transmission apparatus 1 according to the present invention comprises an input shaft 15, a plurality of driven gears 21, 22, 23 and 24, a variable cam 31, a reaction apparatus 35, a variable input link 41, one direction clutches 51, 52, 53 and 54, a plurality of cam shafts 61, 62, 63 and 64, and a plurality of output links 71, 72, 73 and 74.

The input shaft 15 is rotatably fitted at the frame 11, thus receiving an externally inputted rotational force.

Four driven gears 21, 22, 23 and 24 are provided. Each driven gear 21, 22, 23 or 24 is outwardly arranged in a radial shape with respect to the input shafts 15 with disposing the input 15 at its both sides. Each driven gear 21, 22, 23 or 24 has a 90 angle degree phase difference around the input shaft 15 and receives a driving force from the input shaft 15 in a state that it is rotatably fitted at the frame 11.

The variable cam 31 is housed in the variable input link 41, the rotation radius of which changes by means of an external load.

The reaction apparatus 35 serves to press the variable cam 31 in the radial outward direction with respect to the input shaft. In the present embodiment, there is provided a spring having elastic force as the reaction apparatus 35. The reaction apparatus 35 may be formed of a pneumatic cylinder or a hydraulic cylinder connected with a pneumatic circuit or a hydraulic circuit, thus moving the cylinder forwards or backwards depending on the load transferred to the reaction apparatus 35 instead of the spring.

The variable input link 41 accommodates the variable cam 31 and the reaction apparatus 35 and receives a rotational force of the input shaft 15 and is engaged to the input shaft 15 in a rotation manner. In the present embodiment, as shown in FIG. 3, the variable input link 41 fixedly contacts with an outer end portion of the input shaft 15. Not shown here, the variable input link 41 might fixedly contact with an inner surface of the input shaft 15.

The one direction clutches 51, 52, 53 and 54 are provided at the inner circumference of each driven gear 21, 22, 23 or 24 and receive bidirectional rotational force, to be transferred to each driven gear 21, 22, 23 or 24, only in one direction, thus rotating each driven gear 21, 22, 23 or 24 in one direction. Each one direction clutch 51, 52, 53 or 54 is engaged to be rotatable in the same directions with respect to each driven gear 21, 22, 23 or 24, namely, the clockwise direction or the counterclockwise direction, thus rotating each driven gear 21, 22, 23 or 24 in the clockwise direction or the counterclockwise direction.

Four cam shafts 61, 62, 63 and 64 are provided corresponding to the driven gears 21, 22, 23 and 24, respectively, and the cam shafts 61, 62, 63 and 64 come into inner contact with the one direction clutches 51, 52, 53 and 54, and are rotatably engaged at the frame 11. Hereinafter, for the convenience in descriptions, it is assumed that the cam shaft positioned at the right upper side of FIG. 2 is called a first cam shaft 61, and the link positioned at the left side of the first cam shaft 61 is called a second cam shaft 62, and the link positioned at a lower side of the first cam shaft 61 is called a third cam shaft 63, and the link being diagonal to the first cam shaft 61 is called a fourth cam shaft 64, respectively.

Four output links 71, 72, 73 and 74 are provided corresponding to the driven gears 21, 22, 23 and 24, respectively, and one end of each coupler is integrally linked by mans of one pin 81 provided at the variable cam 31, and the other end of each coupler is rotatably linked to each cam shaft 61, 62, 63 and 64. One end of each output link 71, 72, 73 and 74 connected by the pin 81 rotates idle with respect to the rotational center of the variable input link 41 together with the variable cam 31.

One output gear 91 rotating in intermesh with four driven gears 21, 22, 23 and 24 rotatably comes in outer contact with the front end of the input shaft 15.

At the output gear 91 is integrally connected a circular output shaft 95 which is protruded from the front end of the input shaft 15 and has the same rotation axis line of the same center as the rotation center of the input shaft 15.

A driven sprocket, a driven ear and a driven pulley fixedly come into outer contact with the output shaft 95 as the elements not shown, thus driving the external devices.

The driving force transfers and speed change procedures of the continuously variable transmission apparatus according to a first embodiment of the present invention will be described with the aid of the above disclosed constructions.

The input shaft 15, which rotates in one direction upon receiving an external driving force, rotates the variable input link 41 and rotates the variable cam 31 being eccentric to the variable input link 41, and the rotational force of the variable cam 31 rotates each end of four output links 71, 72, 73 and 74 rotatably engaged to the variable cam 31 in idle states with respect to the rotational center of the variable input link 41.

The variable cam 31 serves to rotate in the normal direction the fourth cam shaft 64 having a phase difference within −180 degree with respect to the first cam shaft 61 in forward and backward directions only when the first cam shaft 61 among the four cam shafts 61, 62, 63 and 64 linked to each of four output links 71, 72, 73 and 74 via four output links 71, 72, 73 and 74 linked to the variable cam 31 by means of the idle rotation of an angle range of 0 degree to 90 degrees, and the variable cam 31 advance-rotates, in a normal direction, the second cam shaft 62 having a phase difference of within a range of +180 degrees with respect to the first cam shaft 61, and rotates in reverse direction the third cam shaft 63 having a phase difference of above 180 degrees with respect to the first cam shaft 61.

As the second cam shaft 62 having a phase difference of +90 degrees with respect to the first cam shaft 61 among the four cam shafts 61, 62, 63 and 64 rotates by a certain angle for actual rotation with the aid of the idle rotation at an angle of 91 to 180 degrees of the variable cam 31, thus forwardly and backwardly moving, in normal direction, the first cam shaft 61 having a phase difference of within −180 degrees with respect to the second cam shaft 62, and advance-rotating, in normal direction, the third cam shaft 63 having a phase difference of within +180 degrees with respect to the second cam shaft 62, and rotating, in reverse direction, the fourth cam shaft 64 having a phase difference of above 180 degrees with respect to the second cam shaft 62.

With the aid of the idle rotation of an angle range of 181 to 270 degrees of the variable cam 31, the third cam shaft 63 having a phase difference of +90 degrees with respect to the second cam shaft 62 among the four cam shafts 61, 62, 63 and 64 rotates at a certain angle for an actual driving, thus forwardly and backwardly rotating, in normal direction, the second cam shaft 62 having a phase difference of within −180 degrees with respect to the third cam shaft 63, and advance-rotating, in normal direction, the fourth cam shaft 64 having a phase difference of within +180 degrees with respect to the third cam shaft 63, and rotating, in reverse direction, the remaining first cam shaft 61 having a phase difference of above 180 degrees with respect to the third cam shaft 63.

With the aid of the idle rotation of an angle of 271 to 361 angle degrees of the variable cam 31, the fourth cam shaft 64 having a phase difference of +90 degrees with respect to the third cam shaft 63 among the four cam shafts 61, 62, 63 and 64 rotates at a certain angle for an actual driving, thus forwardly and backwardly rotating, in normal direction, the third cam shaft 63 having a phase difference of within −180 degrees with respect to the fourth cam shaft 64, and advance-rotating, in normal direction, the fourth cam shaft 64 having a phase difference of within +180 degrees with respect to the third cam shaft 63, and rotating, in reverse direction, the remaining first cam shaft 61 having a phase difference of above 180 degrees with respect to the third cam shaft 63.

One direction clutches 51, 52, 53 and 54 are disposed between the cam shaft and the driven gears 21, 22, 23 and 24 for transferring the movement to the drive gears 21, 22, 23 and 24 only when the normal direction rotation movements of the cam shafts 61, 62, 63 and 64 are in operation, so the output gear 91 intermeshed with the four driven gears 21, 22, 23 and 24 always rotates in normal direction when the input shaft 15 is driven.

As greater load from the circular output shaft 95 provided at the output gear 91 is transferred to the reaction apparatus 35 via the driven gears 21, 22, 23 and 24, the cam shafts 61, 62, 3 and 64, the output links 71, 72, 73 and 74 and the cam 31. When the variable cam 31 comes closer to the central axis line of the variable input link 41, the rotation radius of the variable cam 31 decreases, and the angles of the rotation and reciprocation movements of the cam shafts 61, 62, 63 and 64 become smaller, so the driven gears 21, 22, 23 and 24 operate in the low speed mode. On the contrary, as the smaller load from the circular output shaft 95 is transferred to the reaction apparatus 35 in the above manner, and the variable cam 31 becomes away from the central axis line of the variable input link 41, the rotation radius of the variable cam 31 increases, and the angle of the rotation and reciprocation movements of the cam shafts 61, 62, 63 and 64 increase, whereby the driven gears 21, 22, 23 and 24 become the high speed mode.

When the load from the circular output shaft 95 compresses the reaction apparatus 35, and the variable cam 31 is positioned at the central axis line of the variable input line 41, the variable cam 31 rotates idle in a state that the rotation radius is zero, so the angle of the rotation and reciprocation movements of the cam shafts 61, 62, 63 and 64 become zero, whereby the speeds of the driven gears 21, 22, 23 and 24 become zero. At this moment, since the minimum speed which becomes the reference of the speed change ratio is zero, the speed change ratio becomes 0 to ∞, so the continuously variable transmission apparatus of the present invention can perform speed changes without stages.

Figure 4:
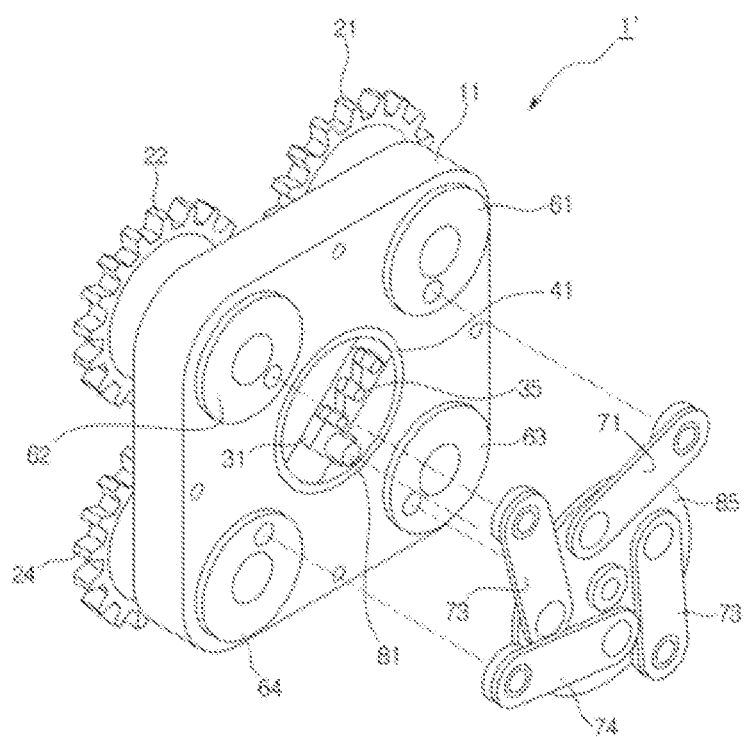
FIG. 4 is a rear perspective view of a continuously variable transmission apparatus according to a second embodiment of the present invention.

FIGS. 4 and 5 show the continuously variable transmission apparatus according to a second embodiment of the present invention. The continuously variable transmission apparatus 1' according to the second embodiment of the present invention, differently from the first embodiment, is characterized in that one end of each of the output links 71, 72, 73 and 74 is connected with the disk plate 85.

One end of each of the output links 71, 72, 73 and 74 is linked with the disk plate 85 while having the same phase difference as the four driven gears 21, 22, 23 and 24, namely, a phase difference of 90 degree angle.

At the center of the disk plate 85 is engaged the pin 81 disposed at the variable cam 31, so the disk plate 85 rotates idle with respect to the rotation center of the variable input link 41 along with the variable cam 31.

The driving force transfer and the speed change procedure of the continuously variable transmission apparatus 1' according to the second embodiment of the present invention is the same as the first embodiment, so the descriptions thereof will be omitted.

In the above embodiments of the present invention, what the four cam shafts are linked to the variable cam with a phase difference of 90 angle degrees in the radial outward direction with respect to the input shaft has been described, but at least 10 or more or less of the cam shafts can be linked to the variable cam with a certain angle to one another in the direction of circumference of the input shaft, in more details, in such a manner that two cam shafts are linked to the variable cam with a phase difference of 180 degrees to each other in the radial outward direction with respect to the input shaft, and three cam shafts are linked to the variable cam with a phase difference of 120 degrees to one another, and five cam shafts are linked to the variable cam with a phase difference of 60 degrees to one another, or six cam shafts are linked to the variable cam with a phase difference of 60 degrees to one another. Any change to the method for linking the cam shafts to the variable cam with a certain phase difference to one another around the input shaft is obvious to a person of ordinary skill in the field.

In the above embodiments of the present invention, what a plurality of cam shafts comes into inner contact with the one direction clutch has been descried, but the plurality of the output links might come into outer contact with the one direction clutch.

The invention claimed is:
1. A continuously variable transmission apparatus, comprising:
   an input shaft receiving an externally inputted rotational force;
   a plurality of driven gears which are arranged around the input shaft each with certain phase difference, thus receiving a driving force from the input shaft;
   a variable cam the rotation radius of which changes by means of an external load;
   a variable input link receiving a rotational force of the input shaft and engaged to the input shaft in a rotation possible manner;

a one direction clutch which receives bidirectional rotational force from the driven gears only in one direction, thus rotating each driven gear in one direction;

a plurality of cam shafts which come into inner or outer contact with the one direction clutch;

a plurality of output links one end of each of which rotates idle with respect to the rotational center of the variable input link along with the variable cam, and the other end of each of which is rotatably engaged to each cam shaft, with the plurality of the output links having same lengths; and a reaction apparatus for pressing the variable cam with respect to the input shaft in a radial outward direction.

2. A continuously variable transmission apparatus according to claim 1, further comprising a disk plate rotating idle with respect to the rotational center of the variable input link along with the variable cam as one end of each of the plurality of the output links is engaged having a phase difference corresponding to the plurality of the driven gears, respectively.

3. A continuously variable transmission apparatus according to claim 1, wherein said variable input link comes into inner or outer contact with the input shaft.

4. A continuously variable transmission apparatus according to claim 1, wherein said input shaft comes into rotatable and inner contact with one output gear rotating in intermesh with the plurality of the driven gears, respectively.

5. A continuously variable transmission apparatus according to claim 4, wherein said output gear has an integral circular output shaft having a rotation axis line of the same center with the rotation center of the input shaft.

6. A continuously variable transmission apparatus according to claim 1, wherein said reaction apparatus is one of a spring, a hydraulic cylinder and a pneumatic cylinder.

* * * * *